July 7, 1942.  G. H. AMONSEN  2,289,162
WASHING MACHINE
Filed Dec. 19, 1940  3 Sheets-Sheet 1
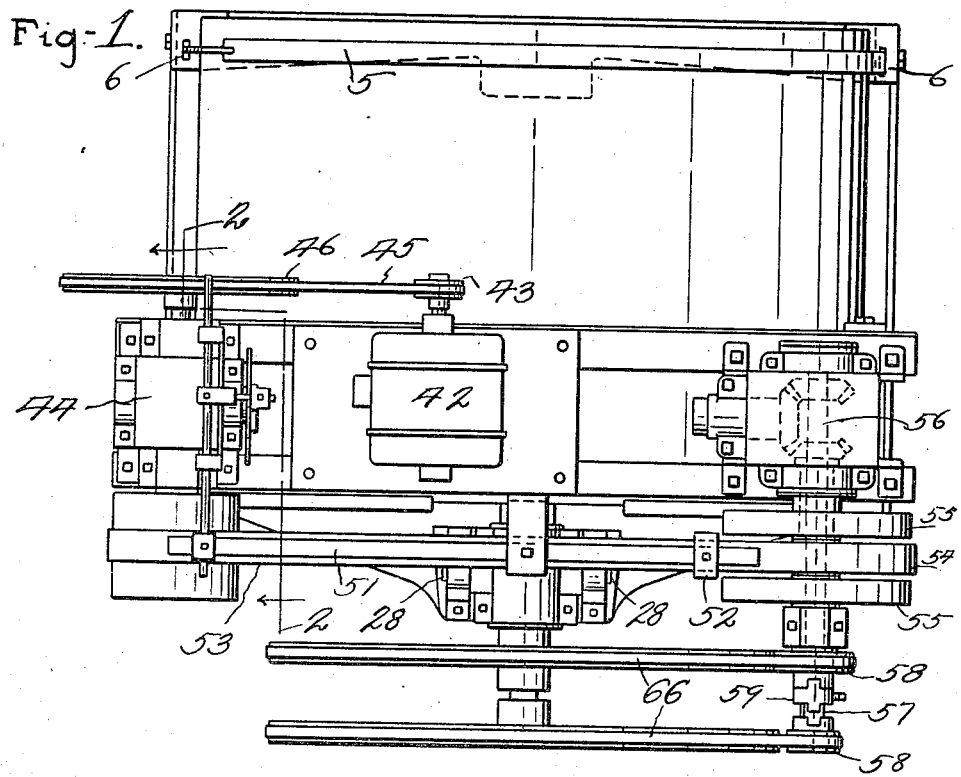
Fig-1.
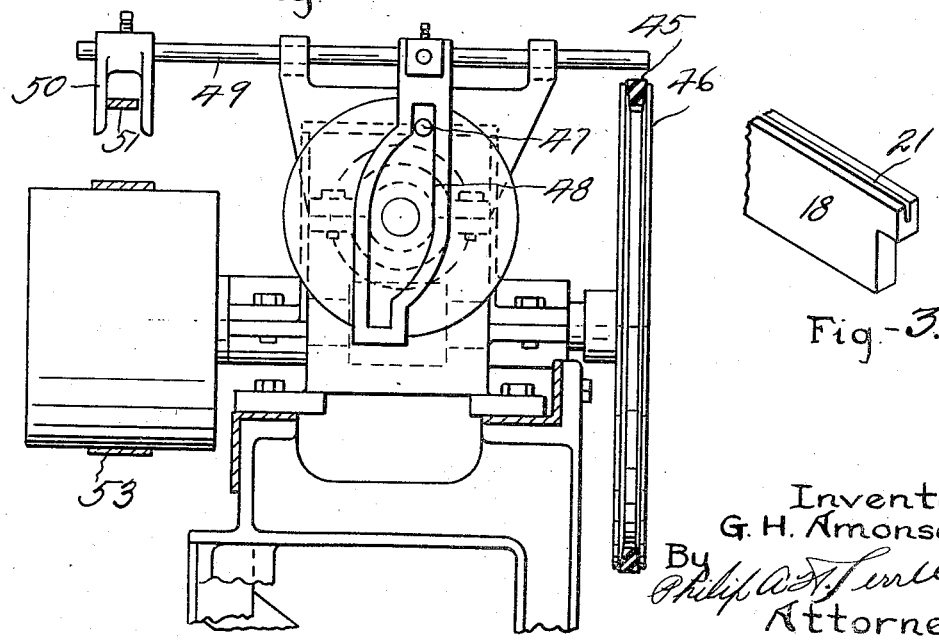
Fig-2.
Fig-3.
Inventor:
G. H. Amonsen.
By
Attorney July 7, 1942.  G. H. AMONSEN  2,289,162
WASHING MACHINE
Filed Dec. 19, 1940   3 Sheets-Sheet 2

Inventor.
G. H. Amonsen.
By
Attorney.

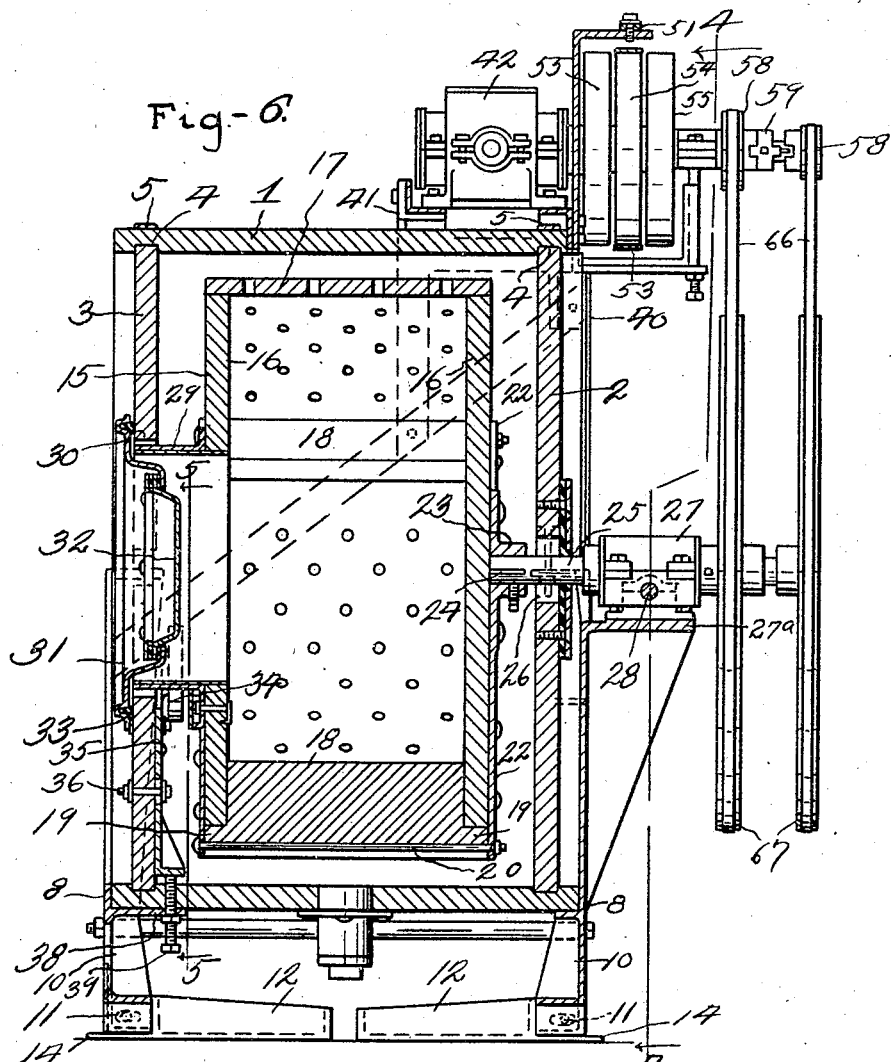
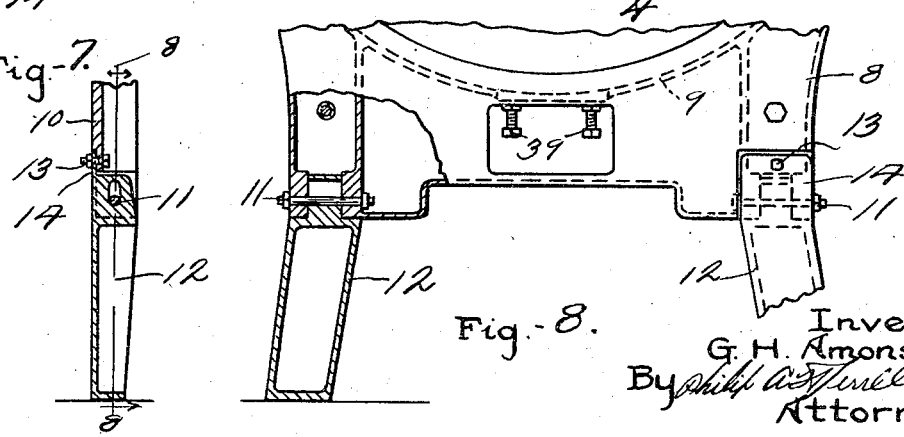

Patented July 7, 1942

2,289,162

UNITED STATES PATENT OFFICE 2,289,162

WASHING MACHINE

George H. Amonsen, Minneapolis, Minn.

Application December 19, 1940, Serial No. 370,896

5 Claims. (Cl. 68—140)

The invention relates to washing machines of the rotatable drum type, and has for its object to provide a device of this kind wherein the drum is provided with a shaft extending through an enlarged aperture in the rear end of the casing and through a packing member and is supported in a rockable bearing so the axis of the drum may move in a vertical plane. Also to provide the drum with a flanged opening opposite the shaft and extending through an opening in the opposite side of the casing and rotatably mounted and supported on rollers beneath the flange and carried by a vertically adjustable bracket.

A further object is to mount the adjustable bracket on the inner side of the front wall of the casing and to provide an adjusting means cooperating with the bracket for forcing the same upwardly to an adjusted position and means for positively holding the bracket in adjusted position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the washing machine.

Figure 2 is a vertical transverse sectional view taken on line 2—2 of Figure 1.

Figure 3 is a detail perspective view of a portion of one of the drum vanes.

Figure 6 is a side view of the machine showing the drum and casing in section.

Figure 7 is a detail sectional view through one of the legs and its connection, showing the leg extended.

Figure 8 is a front elevation of the lower front side of the washing machine, one of the legs being shown in section.

Figure 4:
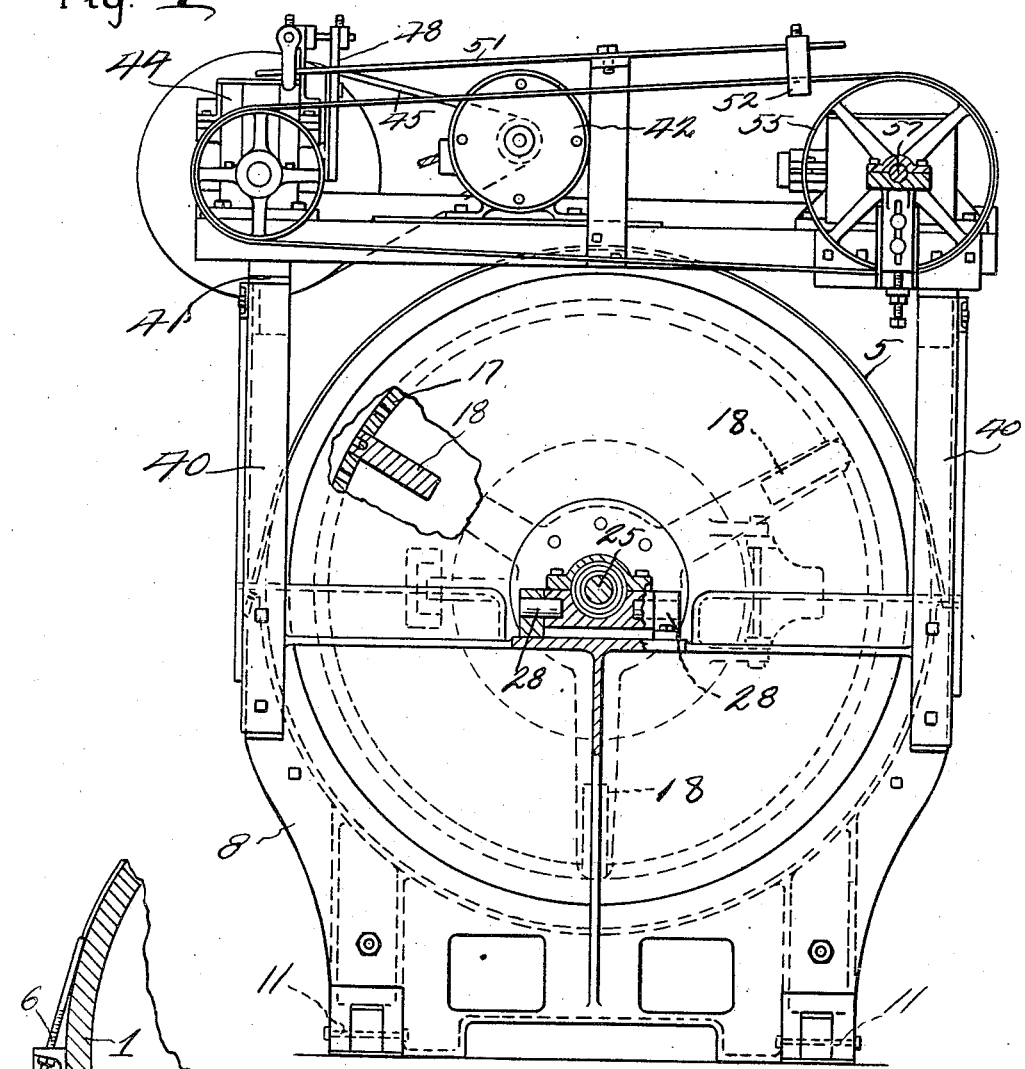
Figure 4 is a vertical longitudinal sectional view taken on line 4—4 of Figure 6.
Figure 5:
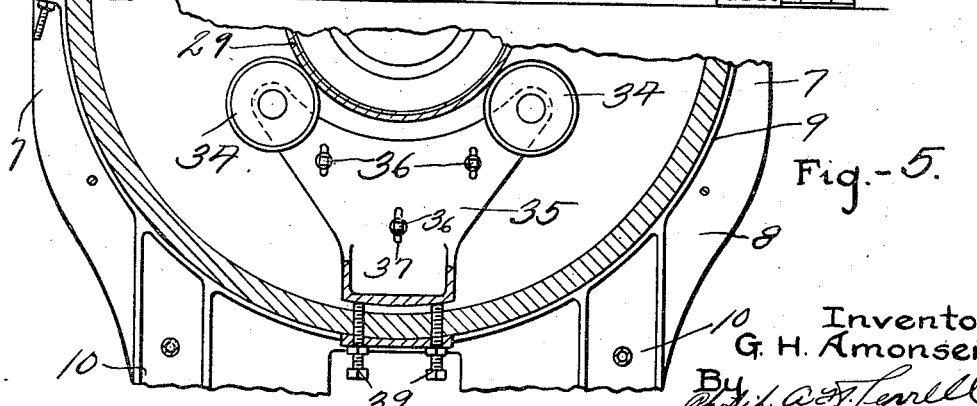
Figure 5 is a detail sectional view taken on line 5—5 of Figure 6.

The present invention is an improvement on my washing machine Patent No. 2,177,631.

Referring to the drawings, the numeral 1 designates a cylindrical casing having a rear wall 2 and a front wall 3. These walls are held in place in the annular channel 4 by means of straps 5, which extend over the upper side of the casing 1, and have their ends connected at 6 to the upwardly extending arms 7 of the base supports 8, and on a flange 9 on which the body 1 is held. The base supports are provided with downwardly extending portions 10, to which are integrally connected loosely, at 11 the folding legs 12, shown in folded position in Figure 6. When the legs are extended they are hingedly moved to the positions shown in Figures 7 and 8 and held rigidly in extended position by means of bolts 13 which extend through the leg extensions 14 and are then secured in extended position by the bolts 13 which extend through the portions 10. It will be seen the washing machine may be adjusted close to the floor or raised, and by hinging the legs less space will be required in shipping and storage.

Disposed within the casing 1 in spaced relation thereto is a drum 15, adapted to be intermittently driven in opposite directions for an agitating operation when clothing is placed within the drum. The drum 15 comprises spaced walls 16 and a circumferential perforated wall 17, and disposed within the drum are spaced tubular blades 18 held in place by means of extensions 19 and transverse bolts 20 extending through longitudinally extending slots 21 in the blades, therefore it will be seen the blades will be positively held in position and the drum assembled as the bolts 20 also extend through radial arms 22 carried by the walls 16 of the drum. The arms 22 carried by the rear plate 16 merge into a hub 23 to which is keyed at 24 the drive shaft 25, which drives the drum. Drive shaft 25 extends through an enlarged opening 26 in the rear casing wall 2 and is rotatably mounted in a rock bearing 27, which is rockably mounted on pintles 28, clearly shown in Figures 6 and 1. It will be noted that the shaft 25, along with the drum, has freedom of movement in a vertical longitudinal plane, the purpose of which will presently appear. The front wall 16 of the drum is provided with a flange 29 which extends through an opening 30 in the front wall 3 of the casing, and this opening is provided with a hinged closure 31 having a transparent dished portion 32 so access may be had to the drum for placing clothing in the drum or removing clothing therefrom, and at the same time the washing operation can be observed as desired. The closure 31 is provided with a gasket 33 for preventing water from being splashed from within the casing 1.

The front end of the drum 15 is supported on its lower side by spaced rollers 34 carried by a vertically adjustable bracket 35. The bracket is adjustable on bolts 36 which extend through elongated apertures 37 in the bracket and carried by the front wall of the casing so they can be manipulated from the outside of the casing. The lower end of the bracket 8 is provided with an inwardly extending member 38 through which adjusting bolts 39 are threaded. The adjusting bolts 39 extend upwardly through the stationary casing 1 and into engagement with the bottom of the adjustable bracket 35. Therefore, it will be seen that the supporting rollers 34 may be adjusted upwardly or downwardly for supporting the forward end of the drum and the rock bearing 27, incident to its rockable movement in a vertical longitudinal plane, will adjust itself so that the drive shaft 25 will not bind in the bearing.

Extending upwardly from one of the base supports 8 is a bearing support bracket 27a which in turn carries arms 40 of a motor supporting frame 41, and on which is supported a motor 42 having a drive pulley 43. The drive pulley 43 drives a belt shifting mechanism 44 through the belt 45 and pulley 46. The belt shifting mechanism is of the type shown in my prior patent and rotates a wrist pin 47 in a cam plate 48 for reciprocating a belt shifter rod 49 having a bifurcated member 50 for oscillating a pivoted belt shifting arm 51 which terminates in a belt fork 52 in which fork the upper flight of the belt 53 travels. The belt 53 is shown in Figure 1 on the intermediate idle pulley 54 and is shifted to reversing pulleys 55 intermittently for operating the reversing gear 56 of the type shown in my prior patent for rotating the drum intermittently in opposite directions, during a washing operation. The reversing mechanism 56 drives a shaft 57 and different size drive pulleys 58 according to the position of the slidable clutch element 59 which is splined on the shaft 57. It will be noted that these pulleys are of different size, consequently when either one is driven a different speed of rotation is imparted to the drum through the belt 66 and pulleys 67 carried by the driven shaft 25.

From the above it will be seen that a washing machine is provided of the rotary type which is simple in construction, the parts reduced to a minimum, and one cheaply manufactured and sold.

The invention having been set forth what is claimed as new and useful is:

1. A washing machine comprising a casing, a drum rotatably mounted in said casing, means for rotating said drum successively in opposite directions, said drum having a horizontal axis, a drive shaft carried by said drum axially thereto of at one end, a hinged bearing for said drive shaft, means for rotating said drive shaft, a flanged opening carried by the other end of the drum and extending through an opening in the casing, a vertically adjustable bearing for said flange beneath the flange and means for adjusting said bearing upwardly or downwardly from the outside of the casing.

2. A device as set forth in claim 1 wherein the drive shaft extends through an elongated opening in the casing and a fluid tight packing enclosing said opening and surrounding the drive shaft.

3. A device as set forth in claim 1 including a closure for the casing opening through which the drum flange extends.

4. A device as set forth in claim 1 wherein the adjustable bearing for the drum flange comprises a vertically adjustable plate, said adjustable plate being vertically adjustable on the inner side of an end of the casing, bolts extending through said end and plate, spaced rollers carried by the upper end of said plate and engaging the drum flange below the axis thereof and adjusting bolts extending upwardly through the bottom of the casing in engagement with said plate.

5. A washing machine comprising a casing, a horizontally disposed rotatable drum within the casing, one end of said drum having an annular flange forming an opening to said drum, a vertically adjustable supporting bracket and bearing for said annular flange, a drive shaft carried by said drum and extending through the opposite end of the casing, means for driving said shaft and a vertically rockable bearing in which said shaft is mounted.

GEORGE H. AMONSEN.